Patented June 4, 1940

2,203,363

UNITED STATES PATENT OFFICE 2,203,363

HIGH MOLECULAR WEIGHT SUBSTITUTED ETHINYL CARBINOLS

Anderson W. Ralston, Chicago, Ill., assignor to Armour and Company, Chicago, Ill., a corporation of Illinois No Drawing. Application May 23, 1938, Serial No. 209,605

5 Claims. (Cl. 260—632)

This invention relates to high molecular weight substituted ethinyl carbinols and it comprises processes wherein high molecular weight ketones are reacted with sodium or potassium acetylides, or substituted metallic acetylides, to give sodium or potassium derivatives of substituted ethinyl carbinols which are then hydrolyzed to the corresponding ethinyl carbinols.

High molecular weight substituted ethinyl carbinols, such as 1,1-diundecyl-2-propyn-1-ol, are compounds of exceptional scientific and commercial interest. Because of their high degree of unsaturation combined with the presence of the hydroxyl group they can be polymerized readily to resins and plastics. They are also useful for incorporation into various plastic compositions in order to impart plasticity thereto. Low molecular weight substituted ethinyl carbinols have been prepared by the action of Grignard reagents, such as acetylene magnesium bromide, upon ketones. This method has not been applied to the preparation of high molecular weight ethinyl carbinols. A commercially satisfactory method of preparing high molecular weight substituted ethinyl carbinols would make such compounds available for wide uses in the plastic and resin fields.

I have discovered that high molecular weight ethinyl carbinols of the general formula

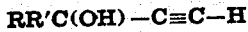

or RR'C(OH)—C≡C—C(OH)RR' can be prepared readily in substantial yields by the action of metal acetylides, such as sodium acetylide, upon high molecular weight ketones. The most convenient solvent medium for carrying out this reaction is liquid ammonia. The general equation for the reaction is as follows:

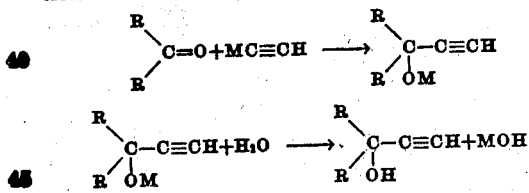

I have found that this reaction proceeds smoothly in liquid ammonia and other non-aqueous solvents. When liquid ammonia is employed as the solvent it is not necessary to isolate the metal acetylide from the ammonia solution in which it is formed but it can be reacted directly with the ketones and the end product of the reaction isolated. The following examples can be given as illustrative of my invention:

EXAMPLE 1

1,1-ditridecyl-2-propyn-1-ol

Two and three-tenths grams of sodium are added to 75 cc. of liquid ammonia and sufficient acetylene added to discharge the blue color. Seven and seven-tenths grams of myristone are then suspended in about 50 cc. of liquid ammonia, the mixture added to the ammonia solution of the acetylide and the whole maintained in a steel bomb. The bomb is closed and the temperature allowed to rise to room temperature. The reaction mixture is kept under pressure at room temperature for a period of about 48 hours with occasional shaking. The pressure is then released and the ammonia evaporated. The reaction product is then hydrolyzed with ice, the aqueous mixture filtered, and the filter cake dried. The crude product is next dissolved in 150 cc. of acetone and the acetone solution filtered. The acetone is finally evaporated and a residue of 5 grams of 1,1-ditridecyl-2-propyn-1-ol obtained. This compound can be recrystallized from alcohol. It is a waxy solid melting at 34–35° C., and upon distillation it decomposes into myristone and acetylene.

EXAMPLE 2

1,1-diundecyl-2-propyn-1-ol

Two and three-tenths grams of sodium are reacted with acetylene in ammonia to give ethinyl sodium according to Example 1. Eight and five-tenths grams of laurone suspended in about 50 cc. of liquid ammonia are then added and the whole placed in a steel bomb. The bomb is then closed and allowed to stand for 18 hours at room temperature with occasional shaking. The pressure is then released, the contents poured onto ice and then filtered. The cold, solidified filter cake is dissolved in acetone and the acetone evaporated. Six and five-tenths grams of 1,1-diundecyl-2-propyn-1-ol are obtained, which is a liquid boiling at 210–215° C. at 3 mm. with slight decomposition into laurone and acetylene.

1,1-diundecyl-2-propyn-1-ol is also obtained by the reaction of ethinyl sodium with laurone using ether as the solvent. After 4 days at room temperature a yield of 4 grams of 1,1-diundecyl-2-propyn-1-ol is obtained from 8.5 grams of laurone starting material.

EXAMPLE 3

1,1-diheptadecyl-2-propyn-1-ol

Two and three-tenths grams of sodium are converted to ethinyl sodium and reacted with 10 grams of stearone in liquid ammonia. The reaction is allowed to proceed under pressure for 40 hours at room temperature, after which the reaction mixture is poured upon ice, the aqueous mixture filtered and the solid filter cake taken up in acetone. It is recrystallized from alcohol and 7.5 grams of 1,1-diheptadecyl-2-propyn-1-ol obtained. This is a wax-like solid melting at 58–59° C. It cannot be distilled without decomposition into stearone and acetylene.

Example 4

*1-diphenyl-1-heptadecyl-propyn-1-ol*

Two and three-tenths grams of sodium are converted to ethinyl sodium according to the method described under Example 1. This is then reacted for 20 hours with 8.4 grams of diphenyl heptadecyl ketone suspended in 50 cc. of liquid ammonia. The reaction is conducted in a steel bomb at atmospheric temperatures. After hydrolysis four and five-tenths grams of 1-diphenyl-1-heptadecyl-propyn-1-ol are obtained which melts at 54–55° C. after recrystallization from alcohol.

Example 5

*1,1-diundecyl-3-vinyl-2-propyn-1-ol*

Ten grams of laurone are reacted with 3.1 grams of sodium vinyl acetylide in liquid ammonia for 18 hours under pressure at room temperature. The product is treated as described under Example 1. Eight and five-tenths grams of 1,1-diundecyl-3-vinyl-2-propyn-1-ol are obtained. This is a yellowish, viscous liquid which can be polymerized to a solid by heating.

Example 6

*1,1,4,4-tetraundecyl-2-butyn-1,4-diol*

Five and two-tenths grams of sodium carbide are suspended in liquid ammonia and 17 grams of laurone dissolved in liquid ammonia added. The reaction is conducted in a steel bomb which is sealed and allowed to remain under pressure at room temperature for 40 hours. The mixture is then poured onto ice and extracted with acetone. Twelve and five-tenths grams of 1,1,4,4-tetraundecyl-2-butyn-1,4-diol are obtained. 1,1,4,4-tetraundecyl-2-butyn-1,4-diol is a solid melting at 110°–111° C.

The same product is obtained in somewhat smaller yields when laurone and sodium acetylide react in liquid ammonia at room temperatures in the presence of trimethyl lead chloride. I do not attempt to explain its formation under these conditions.

When laurone is reacted with sodium acetylide using ether as a solvent and in the absence of lead compounds the greater percentage of the product is 1,1-diundecyl-2-propyn-1-ol. However, a small amount, of the order of 10%, of the diol is also formed.

Having thus described my invention, what I claim is:

1. Acetylenic compounds containing the grouping

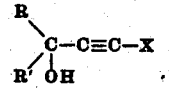

wherein R is an alkyl radical containing at least ten carbon atoms, R' is a radical chosen from the group consisting of alkyl radicals containing at least ten carbon atoms and aryl radicals, and X is a radical chosen from the group consisting of hydrogen, an alkyl radical and the radical

wherein R and R' are radicals defined as aforesaid.

2. Acetylenic compounds of the general formula

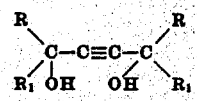

wherein R is an alkyl radical of at least ten carbon atoms and $R_1$ is chosen from the group consisting of alkyl radicals of at least ten carbon atoms and aryl radicals.

3. 1,1-ditridecyl-2-propyn-1-ol.
4. 1,1-diheptadecyl-2-propyn-1-ol.
5. 1,1,4,4-tetraundecyl-2-butyn-1,4-diol.

ANDERSON W. RALSTON.